United States Patent Office 3,501,434
Patented Mar. 17, 1970

3,501,434
EPOXY-NEOPRENE COMPOSITIONS
Alfred C. Chadwick, Birmingham, and Robert W. Hocher, Livonia, Mich., assignors to The Firestone Tire & Rubber Company, Akron, Ohio, a corporation of Ohio
No Drawing. Continuation-in-part of application Ser. No. 311,968, Sept. 27, 1963. This application Sept. 26, 1966, Ser. No. 586,594
Int. Cl. C08f *45/28, 51/28;* C08g *45/04*
U.S. Cl. 260—33.6     5 Claims

ABSTRACT OF THE DISCLOSURE

This invention relates to adhesive compositions comprising mixtures of 100 parts by weight of a sulfur interpolymerized rubbery chloroprene polymer stabilized with thiuram disulfide, about 30 to 140 parts by weight of a liquid epoxy resin and an aliphatic tertiary amine curing agent.

---

This application is a continuation-in-part of our application Ser. No. 311,968 filed Sept. 27, 1963 and now abandoned.

This invention relates to elastomeric adhesive products which have unusual properties of strength and adhesion and which is especially suitable for adhesively securing a wide variety of structural members of the same or different composition such as metal, glass, plastics, ceramics, wood, flexible tile, plastic and concrete.

It is the primary object of the present invention to provide chemical materials which are available in a flowable form so that they may be gunned, poured, brushed, or sprayed onto the desired surfaces and which will convert into an elastomeric material having exceptional adhesion for a wide variety of surfaces. Such elastomeric materials are suitable for use as sealers and caulking compounds between solid bodies and may be applied as a filling for expansion joints in concrete structures and in curtain wall buildings and a variety of similar applications. They are also useful as adhesives which are capable of absorbing heavy stresses without cracking. Materials for these applications have previously been formed from polysulfide-type polymeric materials. Polysulfides, however, have had many disadvantages including low strength, undesirable odor, high cost and the like.

The elastomers of the present invention combine the characteristic extensibility and resilience of neoprene with the strength and adhesion of epoxy resin. The formulations used to produce the elastomeric adhesives of the invention take the form of two part systems, in which each part is a fluid, that are combined immediately prior to application and which cure together in a relatively short time at room temperature and/or elevated temperatures to form a rubbery end product which may be elastic or rigid. These formulations are often mixed in quantities of approximately the same magnitude. The resultant compositions have properties of elongation and adhesion which cannot be achieved by either of the principal components alone. They will adhere to oily surfaces as well as surface treated metal and super-smooth surfaces such as glass and porcelain more satisfactorily than compositions made from the unmodified epoxy component or from the neoprene component alone.

One component of the formulation includes an epoxy resin and a neoprene elastomeric rubber together with various plasticizers and extenders. The epoxy resins employed in the practice of the invention are liquid, low molecular weight resins obtained by reacting bisphenol A with epichlorohydrin. The neoprenes employed in the practice of the invention are sulfur interpolymerized rubbery chloroprene polymers stabilized with thiuram disulfide. The epoxy resin and the neoprene may be present in various ratios which provide varying results. These ratios lie between the ratios of about 30 to about 140 parts by weight epoxy resin per 100 parts by weight neoprene and more preferably the compositions of the invention contain from about 40 to about 100 parts by weight epoxy resin per 100 parts by weight of neoprene. Formulations containing less than 10 parts by weight of epoxy resin per 100 parts by weight of neoprene require an excessively long time to develop satisfactory evidence of adhesion although the resultant mass may be firm. Formulations containing more than 140 parts by weight of epoxy resin to 100 parts by weight of neoprene result in products exhibiting poor tear strengths.

The component containing the neoprene and the epoxy resin is formulated by blending these materials with various plasticizers which preferably constitute coal tar, terpene compounds such as pine oil and the aliphatic tall oil fatty acid esters of aliphatic alcohols as well as highly refined non-volatile types of petroleum hydrocarbon oils. Chlorinated aliphatic compounds such as chlorinated paraffins have also been successfully used as plasticizers for the epoxy resin-neoprene component. Thickeners, such as silica gel and gelling types of castor oil derivatives, may be added to the neoprene-epoxy resin component to provide a desired viscosity for various forms of application. Aliphatic ketones such as acetone, methyl ethyl ketone, etc., as well as aromatic solvents, i.e., benzene, toluene, xylene, may be used to reduce the viscosity of the neoprene-epoxy resin component. Phenol as well as ring substituted phenolic compounds may be added to certain formulations of this component to accelerate the cure of the neoprene-epoxy resin component when it is blended with the amine component.

The amine contained in the second component of the formulation must be capable of catalyzing the cure of the epoxy-resin and the neoprene together at room temperatures and/or elevated temperatures in a relatively short time. It must also have a consistency capable of being easily blended with the neoprene-epoxy resin compound. Aliphatic tertiary amines have this capability. Particularly suitable amine catalysts of this type for practice of the invention are aliphatic tertiary amine-substituted phenols, e.g., 2,4,6 - tri(dimethylaminomethyl) phenol, and the bicyclic aliphatic tertiary amine, triethylenediamine, more accurately referred to as 1,4-diazabicyclo [2.2.2] octane. In certain of the perferred formulations a phenolic tertiary amine compound is blended with other amines such as N,N,N',N' tetrakis (2-hydroxypropyl) ethylene diamine; this last compound aids in the curing of the epoxy resin-neoprene blend. Various aromatic petroleum oils, chemical type plasticizers, and thinners may also be blended with the principal amine as well as may be coal tar and phenolic derivatives; these act as extenders and softeners in the cured compositions.

The constituents of each of the components are blended in a mixer for a sufficient period of time to produce completely homogeneous compositions. In application, the two components are mixed in a ratio which depends on their particular composition and may vary from a ratio of 1 to 1 by volume up to the ratio of 20:1 by volume. The resulting mixture is then applied to the elements to be joined or sealed in a manner suitable to the particular application and the resultant adhesive joint rapidly cures to a rubber-like mass having unique properties of strength, elongation, and adhesion.

In addition to the components referred to above the compositions of the present invention may contain mineral and vegetable fillers, reinforcing agents and various pigments.

Other objectives, advantages and applications of the present invention will be made apparent by the following detailed descriptions of several preferred embodiments of the invention.

EXAMPLE 1

This formulation is prepared in two parts:

Part A

| | Lbs. |
|---|---|
| Neoprene KNR [1] | 350 |
| Liquid epoxy resin (Epon H–25) (epoxide equivalent of 182, viscosity @ 25° C. of 57 poises) [2] | 336 |
| Aromatic petroleum oil (Plasticizer AN–3, flash point 231° F.) | 175 |
| Aromatic oil (Plasticizer XS3A, flash point 290° F.) | 26.25 |
| Aromatic oil Plasticizer #53, flash point 405° F.) | 87.5 |
| Pine oil | 68.0 |
| Phenol | 17.0 |
| Titanium dioxide | 4.2 |
| Silica gel | 40 |

[1] A low viscosity sulfur-modified chloroprene polymer stabilized with a thiuram disulfide.
[2] Produced by reacting bisphenol A and epichlorohydrin.

All of the above-mentioned ingredients of Part A except the silica gel are blended in a mixer until dissolved and homogeneous in appearance; this may require approximately 12–16 hours. Then the silica gel is added and the mixing is continued until a homogeneous product is again achieved.

Part B

| | Lbs. |
|---|---|
| 2,4,6 tri(dimethylaminomethyl)phenol | 68 |
| N,N,N',N' tetrakis (2-hydroxypropyl)ethylene diamine | 142 |
| Aromatic oil (Plasticizer #53, flash point 405° F.) | 37 |
| Silica gel | 24.5 |

All of the ingredients of Part B are blended in a high speed mixer until a homogeneous mixture is achieved. In the above formulations the silica gel acts as a thickener.

In use four parts of Part A by volume are mixed with one part by volume of Part B. The resultant elastomeric adhesive is tack-free in four hours at 78° F. or it can be cured in twenty minutes at 180° F. The adhesive's optimum properties are reached in 72 hours at 78° F. It is particularly useful in forming structural metal bonds. It has excellent adhesion to metals; it bonds equally well to clean and oily metal surfaces. At room temperature a fully cured metal to metal bond prepared with this formulation exhibits a shear tensile strength of 1000 p.s.i. The adhesive bond is very resistant to water, soap solutions, oils, and gasoline.

EXAMPLE 2

Part A

| | Lbs. |
|---|---|
| Neoprene KNR | 910 |
| Liquid epoxy resin (Epon H–25, epoxide equivalent of 182) | 336 |
| Aromatic oil (Plasticizer XS3A, flash point 290° F.) | 1000 |
| Methyl ethyl ketone | 250 |
| Silica gel | 160 |

Part B

| | Lbs. |
|---|---|
| 2,4,6 tri(dimethylaminomethyl)phenol | 68 |
| N,N,N',N' tetrakis (2-hydroxypropyl) ethylene diamine | 142 |
| Carbon black dispersion in dioctyl phthalate | 41 |

In the above formulation the methyl ethyl ketone performs as a thinner. Each of Parts A and B is thoroughly blended in a high speed mixer until completely homogeneous mixtures are obtained. To make the elastomeric adhesive 4 parts by volume of Part A is mixed with 1 part by volume of Part B. The resultant mass becomes tack free in 12 hours at 78° F. Its optimum cure is attained in 72 hours at 78° F. The adhesive is very useful as an architectural sealer; it exhibits tensile shear strength greater than 200 p.s.i. when applied to unprimed aluminum. It exhibits excellent aging properties and adhesion even after prolonged weathering conditions.

EXAMPLE 3

Part A

| | Lbs. |
|---|---|
| Neoprene FB [1] | 100 |
| Liquid epoxy resin (Epon H–25, epoxide equivalent of 182) | 80 |
| Aromatic oil (Plasticizer #53, flash point 405° F.) | 30 |
| Aromatic oil (Plasticizer XS3A) | 50 |
| Methyl ethyl ketone | 40 |

[1] A low viscosity sulfur interpolymerized chloroprene polymer stabilized with a thiuram disulfide.

Part B

| | Lbs. |
|---|---|
| 2,4,6 tri(dimethylaminomethyl)phenol | 24 |
| Dinonyl phenol | 36 |
| Aromatic oil (Plasticizer #53, flash point 405° F.) | 102 |
| Refined coal tar | 130 |

In Part B the coal tar is employed as a plasticizer. Each of Parts A and B is blended in a high speed mixer until completely homogeneous. Parts A and B are then mixed in a ratio of one part by volume of Part A to one part of Part B by volume. It requires 12 hours at 78° F. to develop a tack free surface. The resultant mass attains an optimum cure in 48 hours at 78° F. or in 6 hours when cured at 130° F. The resultant elastomeric mass has an adhesion to concrete, as exhibited by tensile pulls, in excess of 200 p.s.i. Its hardness is 10 as determined by a Shore A Durometer. At room temperature the mass exhibits an elongation reading value of greater than 300% and, when cooled to minus 40° F., the elongation value is greater than 160%. This elastomeric adhesive is useful as a sealer of bituminous and Portland cement joints; it may be extruded directly into prepared joints. The consistency is such as to fill joints without the inclusion of air.

EXAMPLE 4

This formulation is prepared in three parts.

Part A

| | Lbs. |
|---|---|
| Liquid epoxy resin (Epon 828, epoxide equivalent of 180–195, viscosity at 25° C., 100–160 poises) [1] | 400 |
| Pine oil | 80 |
| Phenol | 20 |
| Aromatic oil (Plasticizer #53, flash point 405° F.) | 250 |

[1] Produced by reacting bisphenol A epichlorohydrin.

Part A Flexibilizer

| | Lbs. |
|---|---|
| Neoprene KNR | 800 |
| Aromatic oil (Plasticizer AN–3, flash point 231° F.) | 400 |
| 2-benzothiazyl disulfide (MBTS) | 24 |
| Piperidinium pentamethylene-dithiocarbamate | 8 |

Part B

| | Lbs. |
|---|---|
| Refined coal tar | 630 |
| 2,4,6-tri(dimethylaminomethyl)phenol | 120 |

Each of Parts A and B is thoroughly blended in a mixer until homogeneous. Part A, Part A Flexibilizer and Part B are mixed in proportions of equal parts of each by volume, Part A and Part A Flexibilizer being first mixed together prior to addition of Part B. The use and the characteristics of this elastomeric adhesive are substantially similar to those of the adhesive formed in Example 3.

EXAMPLE 5

Part A

| | Lbs. |
|---|---|
| Neoprene KNR | 500 |
| Aromatic oil (Mobilsol 44) | 700 |
| Liquid epoxy resin (Epon H-25, epoxide equivalent of 182) | 300 |
| Gelling agent (Thixcin) | 150 |

Part B

| | |
|---|---|
| Triethylene diamine | 40 |
| Aromatic oil (Mobilsol 44) | 372.5 |

In the above formulations the gelling agent performs as a puffing agent that enables the mixed adhesive to remain in the area applied while the mass cures. Each of Parts A and B is thoroughly blended in a high speed mixer until completely homogeneous. To produce the elastomeric adhesive 4 parts by weight of Part A is mixed with 1 part by weight of Part B. The resultant mass becomes firm in 20 minutes. Its optimum cure is attained in 24 hours at 78° F. The characteristics of this elastomeric adhesive are substantially similar to those of the adhesive formed in Example 1.

A wide variety of other formulations have been successfully prepared; each formulation contains a polychloroprene elastomer and an epoxy resin in one component and another component consisting of an amine catalyst capable of converting the neoprene-epoxy resin blend into a vulcanized rubber-type compound that has unusual properties of strength and adhesion.

What is claimed is:
1. An elastomeric adhesive composition comprising in admixture (1) 100 parts of weight of a sulfur interpolymerized rubbery chloroprene polymer stabilized with a thiuram disulfide, (2) about 30 to about 140 parts by weight of a liquid epoxy resin produced by reacting bisphenol A and epichlorohydrin and (3) an aliphatic tertiary amine.
2. A composition in accordance with claim 1 wherein said amine is an aliphatic tertiary amine-substituted phenol.
3. A composition in accordance with claim 1 wherein said amine is 2,4,6-tri(dimethylaminomethyl)phenol.
4. A composition according to claim 1 wherein said amine is triethylene diamine.
5. A composition in accordance with claim 1 containing additionally aromatic oil.

References Cited

UNITED STATES PATENTS

| | | | |
|---|---|---|---|
| 2,665,266 | 1/1954 | Wasserman. | |
| 3,090,793 | 5/1963 | Casement | 260—399 |
| 3,310,603 | 3/1967 | Kelly. | |
| 3,340,224 | 9/1967 | Sherman et al. | 260—837 |

MORRIS LIEBMAN, Primary Examiner

R. HENRY ZAITLER, Assistant Examiner

U.S. Cl. X.R.

260—837, 399

UNITED STATES PATENT OFFICE
CERTIFICATE OF CORRECTION

Patent No. 3,501,434     Dated  March 17, 1970

Inventor(s) Alfred C. Chadwick and Robert W. Hocher

It is certified that error appears in the above-identified patent and that said Letters Patent are hereby corrected as shown below:

In Column 1, Line 30, after "flexible tile," change "plastic" to read --plaster--.

In Column 4, change Footnote 1 occurring immediately below Line 56 from "Produded by reacting bisphenol A epichlorohydrin." to read --Produced by reacting bisphenol A and epichlorohydrin.--

SIGNED AND
SEALED

JUL 28 1970

(SEAL)
Attest:

Edward M. Fletcher, Jr.
Attesting Officer

WILLIAM E. SCHUYLER, JR.
Commissioner of Patents